United States Patent [19]

Hibino

[11] Patent Number: 5,394,266

[45] Date of Patent: Feb. 28, 1995

[54] METHOD OF FABRICATING DIFFRACTION GRATING USING HYPERBOLIC GRATINGS AND AN APPARATUS FOR CARRYING OUT THE METHOD

[75] Inventor: Kenichi Hibino, Tsukuba, Japan

[73] Assignees: Agency of Industrial Science & Technology; Ministry of International Trade & Industry, both of Tokyo, Japan

[21] Appl. No.: 123,069

[22] Filed: Sep. 17, 1993

[30] Foreign Application Priority Data

Sep. 18, 1992 [JP] Japan .................................. 4-274976

[51] Int. Cl.[6] .............................................. G02B 5/18
[52] U.S. Cl. ...................................... 359/574; 359/575
[58] Field of Search ............... 359/566, 568, 569, 573, 359/574, 575; 430/496, 501

[56] References Cited

U.S. PATENT DOCUMENTS

| | | | |
|---|---|---|---|
| 3,748,019 | 7/1973 | Bestenreiner et al. | 359/566 |
| 4,246,338 | 1/1981 | Kaplan | 430/496 |
| 5,315,436 | 5/1994 | Lowenhar et al. | 359/569 |

Primary Examiner—Frank Gonzales
Attorney, Agent, or Firm—Oblon, Spivak, McClelland, Maier & Neustadt

[57] ABSTRACT

A method of fabricating a diffraction grating comprises the steps of illuminating a first hyperbolic diffraction grating having a spatial frequency of f/2 with a spherical wave from a point light source to produce a diffracted ray, diffracting the diffracted ray from the first hyperbolic diffraction grating with second and third hyperbolic diffraction gratings having a spatial frequency of f, merging the diffracted rays from the first and second hyperbolic diffraction gratings on a photographic plate to record interference fringes. The point light source, the first, second and third diffraction gratings, and the photographic plate are disposed to satisfy the relationship $$c/d = (1 - 1/4\,(f\lambda)^2)\frac{\sqrt{1 - \frac{1}{16}(f\lambda)^2} - \sqrt{1 - \frac{1}{4}(f\lambda)^2}}{1 - \sqrt{\left(1 - \frac{1}{16}(f\lambda)^2\right)\left(1 - \frac{1}{4}(f\lambda)^2\right)}}$$

where d is the distance between the point light source and the first diffraction grating and c is the distance between the first diffraction grating and each of the second and third diffraction gratings and also the distance between each of the second and third diffraction gratings and the photographic plate. Also disclosed is an apparatus for carrying out the method.

4 Claims, 4 Drawing Sheets

METHOD OF FABRICATING DIFFRACTION GRATING USING HYPERBOLIC GRATINGS AND AN APPARATUS FOR CARRYING OUT THE METHOD

BACKGROUND OF THE INVENTION

1. Field of the Invention

This invention relates to a method of fabricating a diffraction grating by using three hyperbolic diffraction gratings to record interference fringes on a photographic plate and to an apparatus for carrying out the method.

2. Prior Art Statement

A method has been reported for fabricating a diffraction grating by using a first diffraction grating, a second diffraction grating and a third diffraction grating to record interference fringes on a photographic plate. In the reported method the first diffraction grating (spatial frequency f/2) is illuminated with a quasi-monochromatic spherical wave to produce +1st and −1st order diffracted rays. The +1st order diffracted ray is −1st order diffracted by the second diffraction grating and the −1st diffracted ray is +1st order diffracted by the third diffraction grating and the resulting diffracted rays are merged on the photographic plate, where they produce interference fringes. The interference fringes are recorded on the photographic plate to obtain a diffraction grating. If all of the diffraction gratings are perfect gratings consisting of equally spaced straight grating lines, straight grating lines will be recorded on the photographic plate.

In actuality, however, it is difficult to obtain perfect gratings. If the grating lines are not linear and equally spaced in any of the diffraction gratings, the sums and differences of the such distortions will appear as distortion in the interference fringes recorded on the photographic plate. Generally speaking, the distortion in the recorded grating lines is greater than that in the diffraction gratings used to record them. This makes it difficult to fabricate a low-distortion grating.

The present invention was accomplished in the light of the foregoing circumstances and has as its object to provide a method and an-apparatus for fabricating a diffraction grating by using interference fringes produced by means of three diffraction gratings to record grating lines on a photographic plate, wherein the distortion of the recorded grating lines caused by any distortion of the grating lines of the three diffraction gratings is minimized by mutual cancellation.

SUMMARY OF THE INVENTION

For achieving the aforesaid object, the invention provides a method of fabricating a diffraction grating using hyperbolic gratings comprising the steps of illuminating a first hyperbolic diffraction grating having a spatial frequency of f/2 (lines/mm) with a propagating quasi-monochromatic spherical wave passed through a pinhole constituting a point light source S to produce a diffracted ray, diffracting the diffracted ray from the first hyperbolic diffraction grating with a second hyperbolic diffraction grating having a spatial frequency of f (lines/mm), diffracting the diffracted ray from the first hyperbolic diffraction grating with a third hyperbolic diffraction grating having a spatial frequency of f (lines/mm) and merging the diffracted ray from the second hyperbolic diffraction grating and the diffracted ray from the third hyperbolic diffraction grating on a photographic plate to record interference fringes produced between the rays, the point light source S, the first, second and third diffraction gratings, and the photographic plate being disposed to satisfy the relationship $$c/d = (1 - 1/4\,(f\lambda)^2) \frac{\sqrt{1 - \frac{1}{16}(f\lambda)^2} - \sqrt{1 - \frac{1}{4}(f\lambda)^2}}{1 - \sqrt{\left(1 - \frac{1}{16}(f\lambda)^2\right)\left(1 - \frac{1}{4}(f\lambda)^2\right)}}$$

where d is the distance between the point light source S and the first diffraction grating and c is the distance between the first diffraction grating and each of the second and third diffraction gratings and also the distance between each of the second and third diffraction gratings and the photographic plate.

The apparatus provided by the invention for carrying out this method comprises means for disposing the second and third diffraction gratings at positions where they are illuminated by a +1st order diffracted ray and a −1st order diffracted ray and means for establishing a relationship among the point light source, the first, second and third diffraction gratings, and the photographic plate such that when the distance between the point light source and the first diffraction grating is defined as d and the distance between the first diffraction grating and each of the second and third diffraction gratings and also the distance between each of the second and third diffraction gratings and the photographic plate is defined as c, the ratio c/d satisfies the aforementioned equation.

In this invention, the point light source, the first, second and third diffraction gratings and the photographic plate are disposed so as to satisfy the equation set out earlier and interference fringes are recorded on the photographic plate using a spherical wave. Owing to this arrangement, the effects of any distortions present in the grating lines of the diffraction gratings are mutually canceled when the diffracted ray from the first diffraction grating is diffracted by the second diffraction grating and when it is diffracted by the third diffraction grating. As a result, the lines recorded on the photographic plate have minimal distortion.

The above and other features of the present invention will become apparent from the following description made with reference to the drawings.

DESCRIPTION OF THE PREFERRED EMBODIMENT

Figure 1A:
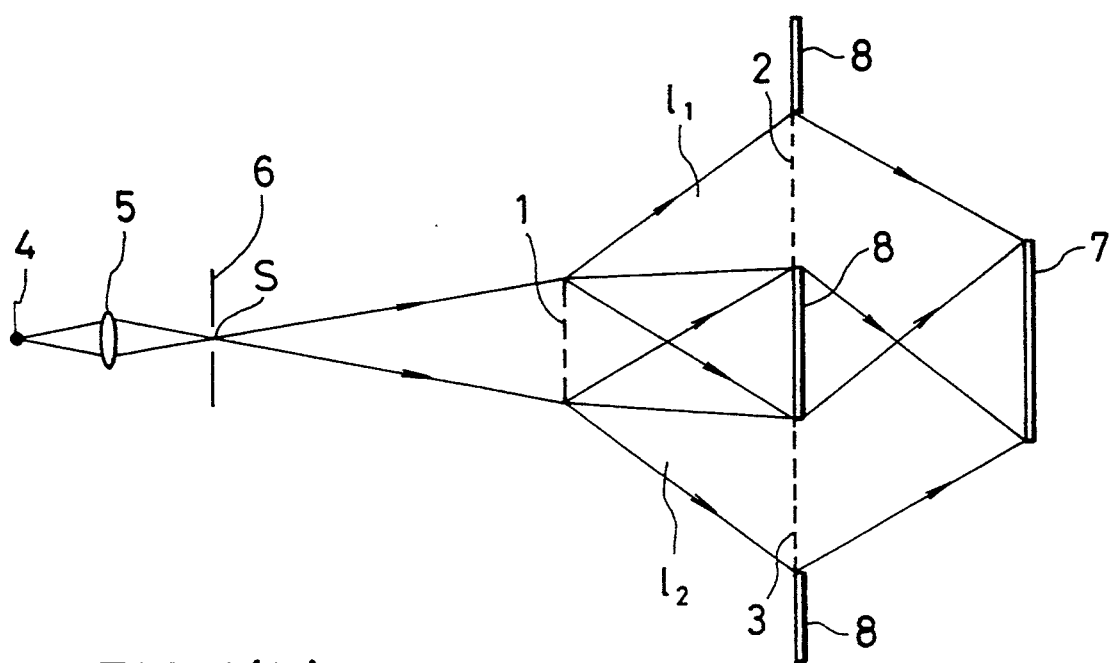
FIG. 1(a) is a schematic view of an optical system for fabricating a diffraction grating in accordance with the invention.

The invention will now be explained with reference to the embodiment shown in FIG. 1. As shown in FIG. 1(a), a first hyperbolic diffraction grating 1 (spatial frequency f/2 (lines/mm)) is disposed on the optical axis of a light source 4 so as to be positioned on the opposite side of a pinhole 6 from a light source lens 5. A photographic plate 7 is positioned to the rear of the first hyperbolic diffraction grating 1. A second hyperbolic diffraction grating 2 and a third hyperbolic diffraction grating 3 (both having a spatial frequency of f (lines/mm)) are positioned between the first hyperbolic diffraction grating 1 and the photographic plate 7. The second hyperbolic diffraction grating 2 is disposed to be illuminated by a +1st order diffracted ray from the first hyperbolic diffraction grating 1 and the third hyperbolic diffraction grating 3 is disposed to be illuminated by a −1st order diffracted ray from the first hyperbolic diffraction grating 1. The second hyperbolic diffraction grating 2 and the third hyperbolic diffraction grating 3 are located at the same position as measured on a straight line connecting the light source 4 and the photographic plate 7. A shield 8 is positioned on the straight line connecting the light source 4 and the photographic plate 7 to be located between the first hyperbolic diffraction grating 1 and the photographic plate 7 at a distance c from the first hyperbolic diffraction grating 1. The shield 8 blocks the 0th order (directly transmitted) diffracted rays from the first hyperbolic diffraction grating 1 so as to prevent the 0th order diffraction rays from the first hyperbolic diffraction grating 1 from reaching the photographic plate 7. The photographic plate 7 is disposed at a position where the −1st order diffraction ray from the second hyperbolic diffraction grating 2 and the +1st order diffraction ray from the third hyperbolic diffraction grating 3 merge.

In this configuration, the point light source S (pinhole 6), the first hyperbolic diffraction grating 1, the second hyperbolic diffraction grating 2, the third hyperbolic diffraction grating 3, and the photographic plate are disposed to satisfy the relationship $$c/d = (1 - 1/4\,(f\lambda)^2) \frac{\sqrt{1 - \frac{1}{16}(f\lambda)^2} - \sqrt{1 - \frac{1}{4}(f\lambda)^2}}{1 - \sqrt{\left(1 - \frac{1}{16}(f\lambda)^2\right)\left(1 - \frac{1}{4}(f\lambda)^2\right)}}$$

where d is the distance between the point light source S and the first diffraction grating 1 and c is the distance between the first diffraction grating 1 and each of the second diffraction grating 2 and the third diffraction grating 3 and also the distance between each of the second diffraction grating 2 and the third diffraction grating 3, and the photographic plate 7.

When the first diffraction grating 1 is illuminated with a round ray of light, the diffracted rays that illuminate the second and third diffraction gratings 2 and 3 are laterally long elliptical rays. The aspect ratio of these elliptical rays varies with the ratio c/d. The distortion of the first diffraction grating 1 is canceled out only when the value of the ratio c/d satisfies Eq. 1.

Figure 2A:
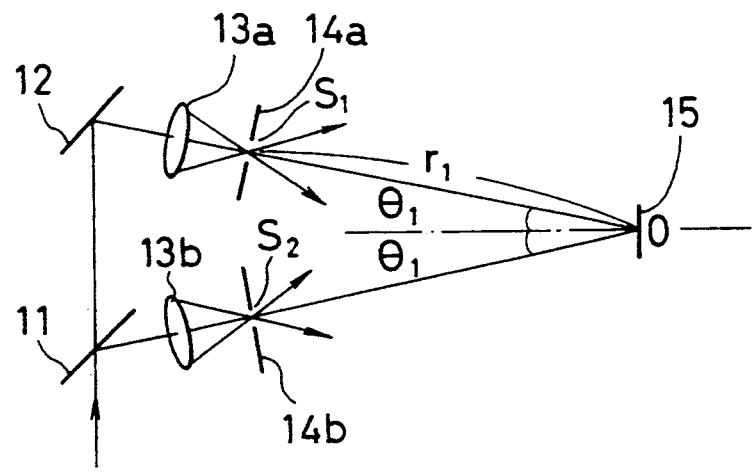
FIG. 2(a) is a schematic view of an optical system used for fabricating the first diffraction grating used in the optical system of FIG. 1.
Figure 2B:
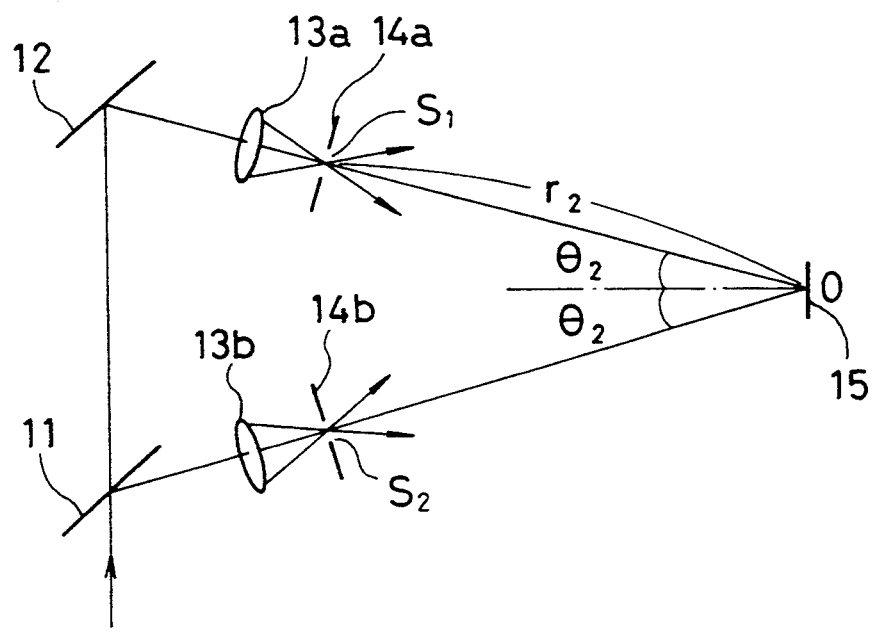
FIG. 2(b) is a schematic view of an optical system used for fabricating the second and third diffraction gratings used in the optical system of FIG. 1.

The method of preparing the first hyperbolic diffraction grating 1, the second hyperbolic diffraction grating 2 and the third hyperbolic diffraction grating 3 used in the invention will now be explained with reference to FIG. 2. A laser beam or other highly coherent light beam is split by a half mirror 11. The transmitted part of the beam is deflected by a mirror 12, collected by a microscope object lens 13a and reduced to a point light source by a pinhole 14a, whereafter it advances to a photographic plate 15 as a spherical wave. The reflected part is collected by a microscope object lens 13b and reduced to a point light source by a pinhole 14b, whereafter it also advances to the photographic plate 15 as a spherical wave. The first hyperbolic diffraction grating 1 is produced on the photographic plate 15 as shown in FIG. 2(a). Specifically, the photographic plate 15 is positioned at a distance $r_1$ from either of the two point light sources S1, S2 and interference fringes are recorded thereon by causing each of the two spherical waves to strike it an angle of $\theta_1$. The spatial frequency of the resulting grating is f/2 (lines/mm). The second hyperbolic diffraction grating 2 and the third hyperbolic diffraction grating 3 are produced as shown in FIG. 2(b). Specifically, the photographic plate 15 is positioned at a distance $r_2$ from either of the light sources S1, S2 and interference fringes are recorded thereon by causing each of the two spherical waves to strike it an angle of $\theta_2$. The spatial frequency of the resulting grating is f (lines/mm).

Figure 1B:
FIG. 1(b) shows the spacing among a point light source, first, second and third diffraction gratings and a photographic plate in the optical system of FIG. 1(a).

The three diffraction gratings fabricated in the foregoing manner are used to configure the diffraction grating fabrication optical system shown in FIG. 1. The first hyperbolic diffraction grating 1 (spatial frequency f/2) is illuminated with a quasi-monochromatic spherical wave, causing it to produce a +1st order (upwardly directed) diffracted ray $l_1$ and a −1st order (downwardly directed) diffracted ray $l_2$. The +1st order diffracted ray $l_1$ is −1st order diffracted by the second hyperbolic diffraction grating 2 (spatial frequency f (lines/mm)) and the −1st order diffracted ray $l_2$ is +1st order diffracted by the third hyperbolic diffraction grating 3 (spatial frequency f (lines/mm)). The resulting diffracted rays merge at the photographic plate 7 to produce interference fringes. By recording the interference fringes on the photographic plate 7 there is obtained a diffraction grating with a spatial frequency of f.

The hyperbolic diffraction gratings 1, 2, 3 are disposed in such manner that the ray diffracted by passing through the center of the first hyperbolic diffraction grating 1 then passes through the center of the second hyperbolic diffraction grating 2 and the center of the third hyperbolic diffraction grating 3, whereafter the two resulting rays merge at the center of the photographic plate.

The photographic plate is required to be a material capable of recording the intensity distribution of light as transmittance variations or index of refraction variations. Examples include silver-halide materials, photoresist materials and photosensitive organic polymer materials.

As mentioned earlier, insofar as the three diffraction gratings are perfect gratings having straight grating lines, straight grating lines will be recorded on the photographic plate. In actual practice, however, it is difficult to obtain perfect gratings. If the grating lines are not straight in any of the diffraction gratings, the sums and differences of the distortions will appear as distortion in the interference fringes recorded on the photographic plate. Generally speaking, the distortion in the recorded grating lines is greater than that in the diffraction gratings used to record them. This makes it difficult to fabricate a low-distortion grating.

Figure 4:
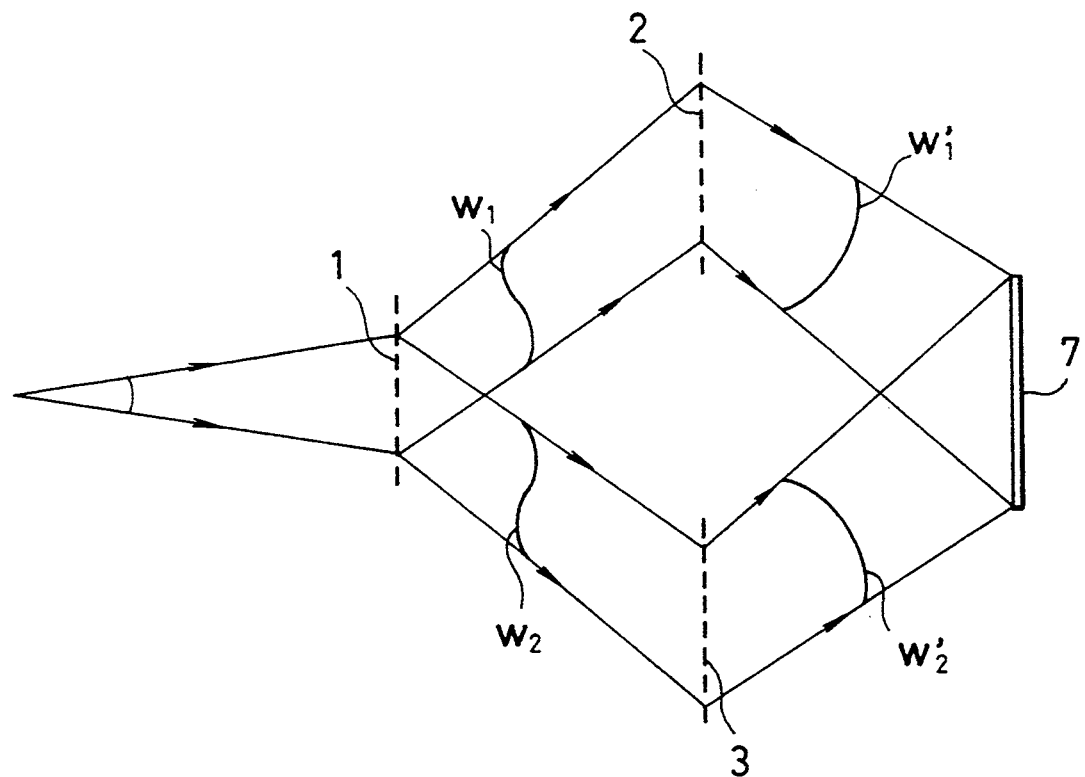
FIG. 4 is schematic view showing the deformation of the wavefront of the diffracted ray at each of the diffraction gratings.

However, the diffraction gratings obtained by recording the interference fringes between two spherical waves using the optical system of FIG. 2 are not linear gratings but gratings with hyperbolic shaped lines. The wave front of the diffracted ray from such a grating differs from that obtained by diffracting a spherical wave with a linear grating. Specifically, because of the distortion of the grating, it becomes a distorted wave front $w_1$, $w_2$, as shown in FIG. 4. However, since the direction of the wave front distortion is diametrically opposite between the case of $+$1st order diffraction and the case of $-$1st order diffraction, it is possible to cancel out the distortion between two wave fronts, as in the case where the wave front $+$1st order diffracted by the first hyperbolic diffraction grating 1 is $-$1st order diffracted by the second hyperbolic diffraction grating 2. Thus, if the recording parameters used at the time of fabricating the first hyperbolic diffraction grating 1, the second hyperbolic diffraction grating 2 and the third hyperbolic diffraction grating 3 are adjusted so that the distortions of the three gratings are of the same magnitude, this principle can be employed to effectively utilize the shape correcting effect of the wave front distortion cancellation for eliminating distortion from the wave fronts emanating from the second hyperbolic diffraction grating 2 and third hyperbolic diffraction grating 3. Owing two this shape correcting effect, the rays leaving the second hyperbolic diffraction grating 2 and the third hyperbolic diffraction grating 3 have diffracted wave fronts $w_1'$, $w_2'$ which are substantially the same as a wave front obtained by diffracting a spherical wave with a linear grating. As a result, linear interference fringes not different from those obtained using two parallel rays are recorded on the photographic plate 7 as grating lines.

Figure 5:
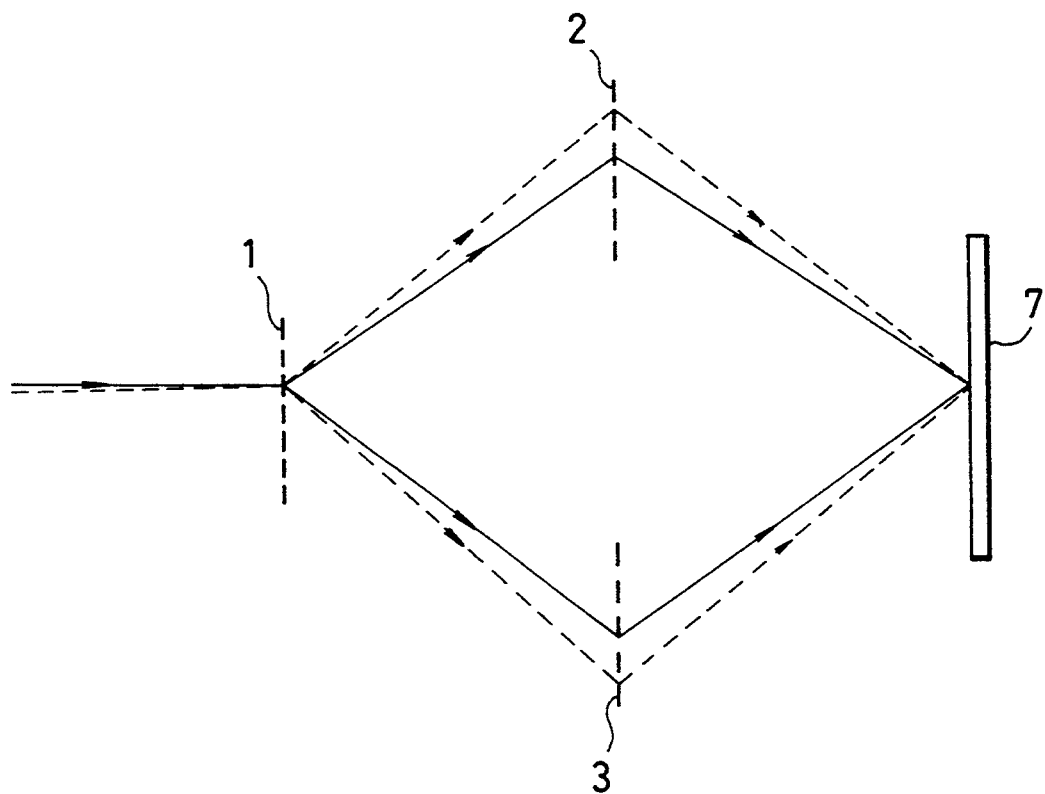
FIG. 5 is a schematic view showing the diffracted state of rays of different wavelength.

As is shown in FIG. 5 and as is also well known in connection with spectroscopes, when a light wave component of a different wavelength is used as the illuminating light, the diffraction occurs at a different angle at the first hyperbolic diffraction grating 1 but since the second hyperbolic diffraction grating 2 and the third hyperbolic diffraction grating 3 have diffraction actions of opposite sign, the rays merge at the same position on the photographic plate despite the difference in the wavelength of the illuminating light. Because of this, the method of the invention works even when conducted using non-monochromatic light. Although the fact that the hyperbolic diffraction gratings 1, 2, 3 have nonlinear grating lines means that the position at which light arrives on the photographic plate differs slightly with wavelength, the amount of this error is so small as to be negligible when quasi-monochromatic light is used. In FIG. 5, the solid lines represent the optical path for light of wavelength $\lambda$ and the broken lines represent the optical path for light of wavelength $\lambda + \Delta\lambda$.

By quasi-monochromatic light is meant light whose light waves are made up of wavelength components with a spread $\Delta\lambda$ of not more than about 1% relative to the wavelength $\lambda$ ($\Delta\lambda/\lambda < 1/100$).

For enabling the first, second and third hyperbolic diffraction gratings to be fabricated with the same distortion, the optical system for producing them is configured to satisfy two conditions. The first of these is that when the spatial frequency of the lines to be recorded on the first hyperbolic diffraction grating 1 is f/2 (lines/mm) and the spatial frequency of the lines to be recorded on the second and third hyperbolic gratings 2 and 3 is f (lines/mm), the distance $r_1$ (during recording of the first hyperbolic diffraction grating 1) and the distance $r_2$ (during recording of the second and third hyperbolic diffraction gratings 2 and 3) between the point light sources (S1, S2) and the center of the photographic plate 15 satisfy the relationship $$r_2/r_1 = \frac{\sqrt{2}}{8} \left( \frac{1 - \frac{1}{16}(f\lambda)^2}{1 - \frac{1}{4}(f\lambda)^2} \right)^{\frac{1}{2}} \times \left[ \frac{(f\lambda)^3}{\left(1 - \sqrt{\left(1 - \frac{1}{16}(f\lambda)^2\right)\left(1 - \frac{1}{4}(f\lambda)^2\right)}\right)^{\frac{3}{2}}} \right] \quad \text{(Eq. 2)}$$

where $\lambda$ is the center wavelength of the quasi-monochromatic light.

The second condition is that the angle $2\theta$ between OS1 and OS2 be selected to satisfy (Eq. 3)

When recording the first hyperbolic diffraction grating 1:
$\sin\theta_1 = f\lambda/4$ When recording the second hyperbolic diffraction grating 2 or the third hyperbolic diffraction grating 3:
$\sin\theta_2 = f\lambda/2$ Up to now there have been two methods available for fabricating diffraction gratings by recording interference fringes. One method consists of using a lens or parabolic mirror to produce a parallel beam, splitting the beam and exposing a photographic plate to the split beam from different directions. The other method consists of passing a light wave through two pinholes to form point light sources, and exposing a photographic plate to the spherical waves propagating from the two light sources, thereby recording interference fringes on the photographic plate.

The present invention is advantageous compared with the first method in that it does not have to use a parallel beam and therefore does not require a lens or a parabolic mirror. Moreover, since a propagating spherical wave passed through a pinhole is used as illuminating light, scattered light produced by the object lens, the mirrors and the laser beam source located on the light path upstream of the pinhole can be almost completely eliminated by the filter effect of the pinhole. The method is therefore suitable for use in fabricating diffraction gratings that produce little stray light and are low in noise. In the conventional method, it is difficult to eliminate internally reflected light in the lens used for producing the parallel beam.

In addition, since the invention method does not require a lens or parabolic mirror, it is suitable for fabricating large-diameter diffraction gratings. And since it uses dispersed light as the illuminating light, the diameter of the diffraction grating produced is advantageously large in comparison with the element diffraction gratings.

The present invention has an advantage over the second method in that the deviation from linear of the grating lines produced is smaller. Moreover, the second method does not produce straight lines but sets of hyperbolic lines. Therefore, for obtaining lines with a practicably small amount of curvature it is necessary to place the light source far from the photographic plate. There is a limit to how far the light source can be separated from the photographic plate, however, because the "waver" of the intervening air disrupts the light waves. Because of this, the second method is not suitable for the fabrication of large-diameter diffraction gratings and, in fact, has rarely been used for this purpose.

In the method of this invention, however, even though the three diffraction gratings fabricated according to this second method for configuring the apparatus of the invention have large distortion, their diffracting actions are such that they cancel out each other's distortion. The finally recorded interference fringes therefore include very little distortion. The degree of this effect will be understood taking as an example the case where light of a wavelength of about 633 nm is used to fabricate a diffraction grating measuring 100 mm in diameter with a deviation of the lines from linear of less than the spacing between two adjacent lines.

Figure 3:
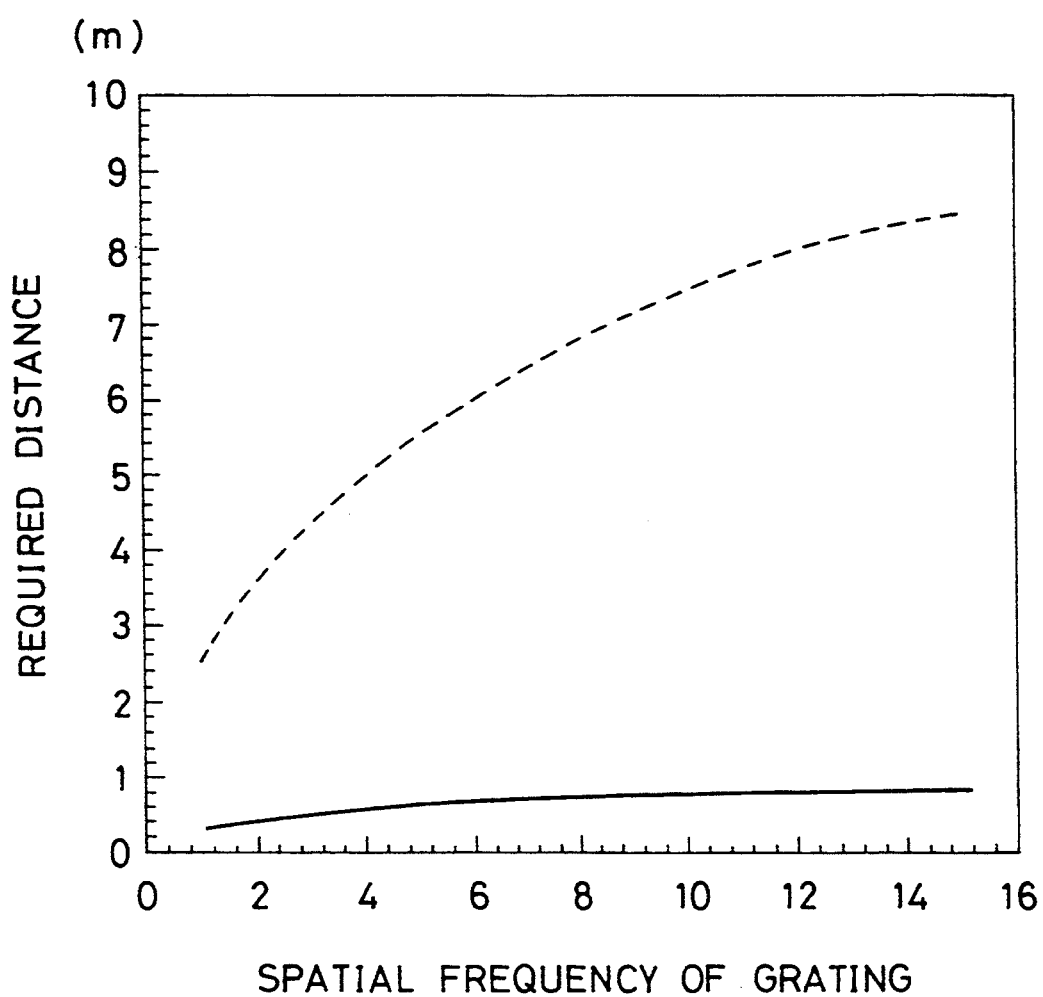
FIG. 3 is a graph showing how the spatial frequency of interference fringes varies with the distance between the photographic plate and the point light source.

FIG. 3 compares the distance between (a) the photographic plate and the point light source when the prior art point light source method is used for the fabrication and (b) the required distance between the photographic plate and the point light source (the larger of $r_1$ and $r_2$) for recording a diffraction grating for use as an element in the apparatus according to the invention.

In FIG. 3, the horizontal axis represents the spatial frequency of the grating, the solid line curve shows the results obtained with the invention and the broken line curve shows the results obtained with the prior art method. For example, in the case of fabricating a diffraction grating with 1000 lines/mm, the prior art method requires a distance of about 7.5 m between the point light source and the photographic plate, while the present invention requires a distance of only about 0.9 m. The invention thus takes up less laboratory or workshop space. In addition, since differently from the prior art technology the invention does not require that the three diffraction gratings be illuminated with a highly coherent monochromatic light, it has the merit of being able to use quasi-monochromatic light of inferior coherency from a light-emitting diode or the like.

What is claim is:

1. A method of fabricating a diffraction grating comprising the steps of illuminating a first hyperbolic diffraction grating having a spatial frequency of f/2 (lines/mm) with a propagating quasi-monochromatic spherical wave passed through a pinhole constituting a point light source to produce a diffracted ray, diffracting the diffracted ray from the first hyperbolic diffraction grating with a second hyperbolic diffraction grating having a spatial frequency of f (lines/mm), diffracting the diffracted ray from the first hyperbolic diffraction grating with a third hyperbolic diffraction grating having a spatial frequency of f (lines/mm) and merging the diffracted ray from the second hyperbolic diffraction grating and the diffracted ray from the third hyperbolic diffraction grating on a photographic plate to record interference fringes produced between the rays, the point light source, the first, second and third diffraction gratings, and the photographic plate being disposed to satisfy the relationship $$c/d = (1 - 1/4\,(f\lambda)^2)\frac{\sqrt{1 - \frac{1}{16}(f\lambda)^2} - \sqrt{1 - \frac{1}{4}(f\lambda)^2}}{1 - \sqrt{\left(1 - \frac{1}{16}(f\lambda)^2\right)\left(1 - \frac{1}{4}(f\lambda)^2\right)}}$$

where d is the distance between the point light source S and the first diffraction grating and c is the distance between the first diffraction grating and each of the second and third diffraction gratings and also the distance between each of the second and third diffraction gratings, and the photographic plate.

2. A method of fabricating a diffraction grating according to claim 1, wherein the first, second and third diffraction gratings are produced with an optical system in which distance $r_1$ (during recording of the first hyperbolic diffraction grating 1) and distance $r_2$ (during recording of the second and third hyperbolic diffraction gratings 2 and 3) between each of two point light sources and the center of a photographic plate satisfy the relationship $$r_2/r_1 = \frac{\sqrt{2}}{8}\left(\frac{1 - \frac{1}{16}(f\lambda)^2}{1 - \frac{1}{4}(f\lambda)^2}\right)^{\frac{1}{4}} \times \left[\frac{(f\lambda)^3}{\left(1 - \sqrt{\left(1 - \frac{1}{16}(f\lambda)^2\right)\left(1 - \frac{1}{4}(f\lambda)^2\right)}\right)^{\frac{3}{2}}}\right]$$

where $\lambda$ is the center wavelength of a quasi-monochromatic light.

3. An apparatus for fabricating a diffraction grating comprising a point light source, a first hyperbolic grating having a spatial frequency of f/2 (lines/mm) disposed on the optical axis of the point light source, a photographic plate disposed behind the first grating, a second hyperbolic grating having a spatial frequency of f (lines/mm) disposed between the first grating and the photographic plate at a position to be illuminated by a +1st order diffracted ray from the first hyperbolic grating, a third hyperbolic grating having a spatial frequency of f (lines/mm) disposed between the first grating and the photographic plate at a position to be illuminated by a −1st order diffracted ray from the first hyperbolic grating, the point light source, the first, second and third diffraction gratings, and the photographic plate being disposed to satisfy the relationship $$c/d = (1 - 1/4\,(f\lambda)^2)\frac{\sqrt{1 - \frac{1}{16}(f\lambda)^2} - \sqrt{1 - \frac{1}{4}(f\lambda)^2}}{1 - \sqrt{\left(1 - \frac{1}{16}(f\lambda)^2\right)\left(1 - \frac{1}{4}(f\lambda)^2\right)}}$$

where d is the distance between the point light source and the first diffraction grating and c is the distance between the first diffraction grating and each of the second and third diffraction gratings and also the distance between each of the second and third diffraction gratings and the photographic plate and λ is the center wavelength of a quasi-monochromatic light.

4. An apparatus for fabricating a diffraction grating according to claim 3, wherein the point light source emits quasi-monochromatic beam with a spherical wave front.

* * * * *

UNITED STATES PATENT AND TRADEMARK OFFICE
Certificate

Patent No. 5,394,266

Patented: February 28, 1995

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kenichi Hibino and Zoltan S. Hegedus.

Signed and Sealed this Thirtieth Day of June, 1998.

BRIAN W. BROWN
*Special Program Examiner*
Technology Center 2800
Physics, Optics, Systems Components,
and Electrical Engineering